US012050588B2

(12) United States Patent
Lueders et al.

(10) Patent No.: US 12,050,588 B2
(45) Date of Patent: Jul. 30, 2024

(54) DETECTION OF OBJECT REDEPLOYMENT DEPENDENCIES ACROSS CONTAINER BOUNDARIES

(71) Applicant: SAP SE, Walldorf (DE)

(72) Inventors: Simon Lueders, Walldorf (DE); Alexander Bunte, Heidelberg (DE)

(73) Assignee: SAP SE, Walldorf (DE)

( * ) Notice: Subject to any disclaimer, the term of this patent is extended or adjusted under 35 U.S.C. 154(b) by 212 days.

(21) Appl. No.: 17/480,838

(22) Filed: Sep. 21, 2021

(65) Prior Publication Data

US 2023/0087066 A1 Mar. 23, 2023

(51) Int. Cl.
G06F 16/22 (2019.01)
G06F 16/23 (2019.01)

(52) U.S. Cl.
CPC ...... *G06F 16/2365* (2019.01); *G06F 16/2282* (2019.01); *G06F 16/2358* (2019.01)

(58) Field of Classification Search
None
See application file for complete search history.

(56) References Cited

U.S. PATENT DOCUMENTS

| 11,086,841 | B1* | 8/2021 | Cseri | G06F 16/221 |
| 2017/0147310 | A1* | 5/2017 | Bregler | G06F 8/60 |
| 2018/0150499 | A1* | 5/2018 | Lee | G06F 11/2038 |
| 2019/0005054 | A1* | 1/2019 | Bregler | G06F 9/445 |

OTHER PUBLICATIONS

Guerrero, Sergio, "Microservices in SAP HANA XSA". Apress, published Aug. 13, 2020, 228 pages. (Year: 2020).*

* cited by examiner

*Primary Examiner* — Scott A. Waldron
(74) *Attorney, Agent, or Firm* — Mintz Levin Cohn Ferris Glovsky and Popeo, P.C.

(57) ABSTRACT

In some implementations, the current subject matter relates to deployment of database objects. In some implementations, there is provided a method that includes receiving a container including a plurality of database objects; detecting whether the plurality of database objects in the container includes a linking object pointing to an object at another container; in response to detecting the linking object, generating an external object table to store metadata about the object at the other container; obtain metadata about the external object to store in the external object table; and store the obtained metadata in the external object table. Related systems, methods, and articles of manufacture are also disclosed.

20 Claims, 13 Drawing Sheets

DETECTION OF OBJECT REDEPLOYMENT DEPENDENCIES ACROSS CONTAINER BOUNDARIES

TECHNICAL FIELD

This disclosure relates generally to data processing and, in particular, to deployment of database objects.

BACKGROUND

Many organizations may rely on enterprise software applications including, for example, enterprise resource planning (ERP) software, customer relationship management (CRM) software, and/or the like. These enterprise software applications may provide a variety of functionalities including, for example, invoicing, procurement, payroll, time and attendance management, recruiting and onboarding, learning and development, performance and compensation, workforce planning, and/or the like. Some enterprise software applications may be hosted by a cloud-computing platform such that the functionalities provided by the enterprise software applications may be accessed remotely by multiple end users at computing devices. For example, an enterprise software application may be available as a cloud-based service including, for example, a software as a service (SaaS) and/or the like.

SUMMARY

In some implementations, the current subject matter relates to deployment of database objects. In some implementations, there is provided a method that includes receiving a container including a plurality of database objects; detecting whether the plurality of database objects in the container includes a linking object pointing to an object at another container; in response to detecting the linking object, generating an external object table to store metadata about the object at the other container; obtain metadata about the external object to store in the external object table; and store the obtained metadata in the external object table.

In some variations, one or more of the features disclosed herein including the following features can optionally be included in any feasible combination. The method may further include determining, based on a validation parameter, whether to check for changes associated with objects external to the container. The method may further include in response to the validation parameter indicating check for changes associated with objects external to the container, checking for at least one change to at least one object external to the container. The method may further include accessing the external object table to obtain the metadata for the object at the other container; obtaining current metadata for the object at the other container; detecting a change to the object at the other container based on a comparison of the metadata and the current metadata; and in response to the change, deploy at least one of the plurality of objects in the container. The metadata may include a version of the object and an identifier of the object. The current metadata may include a current version of the object and a current identifier of the object change. And, if either the identifier or version change, the object detected as a changed object at the other container. The linking object may include a synonym, a projection view, and/or a virtual table. The object may include a database table, wherein at least the linking object depends on data from the database table. The container and the other container may be isolated from each other, such that the plurality of database objects of the container are not accessible to the other container and objects in the other container are not accessible to the container, wherein the other container grants access to the linking object at the container to access the object. The external object table may be stored in a persistency accessible by the container. The metadata may include an identifier of the object and/or a version of the object.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

A deployment infrastructure, such as HEM (HANA Deployment Infrastructure), may comprise, or be comprised in, a service layer of a database, such as an in-memory database (e.g., SAP's HANA database) or other type of database. The deployment infrastructure (DI) may be used to simplify the deployment of database artifacts by providing a declarative approach that defines the Objects database object) to be made (e.g., built, created, executed, and the like) during runtime, while providing a consistent deployment framework into the database. The deployment, via, the DI, may be based on a transactional all-or-nothing deployment model, such that if one of the Objects fails to deploy the deployment is stopped and restarted. And, the DI may provide dependency management of the deployed Objects.

As part of the deployment infrastructure (DI), objects being developed (e.g., development objects) for deployment may be defined within a container. For a given database schema, artifacts defining the database schema may be provided within a container, which can be stored and then be deployed, via the deployment infrastructure, for runtime instantiation of the objects of the database. The deployment infrastructure (DI) "container" may be considered to provide the database schema. And, the DI container may provide artifacts (e.g., definitions and access logic) written in a declarative manner. The container may be stored and used to provide multiple deployments to create multiple databases. Alternatively, or additionally, the container may provide sandboxing and/or enhanced security options for the database artifacts within the container. Alternatively, or additionally, objects may be owned by an owner that is specific; to a container (e.g., a container-specific technical object owner). As such, each user (e.g., a technical user) may only have access to its local container objects (which it "owns"), so foreign objects in other containers may not be accessed. However, a "synonym" object may be provided in the container to provide access to a foreign object, such as a table, after an access grant by the foreign object's technical user.

Figure 1A:
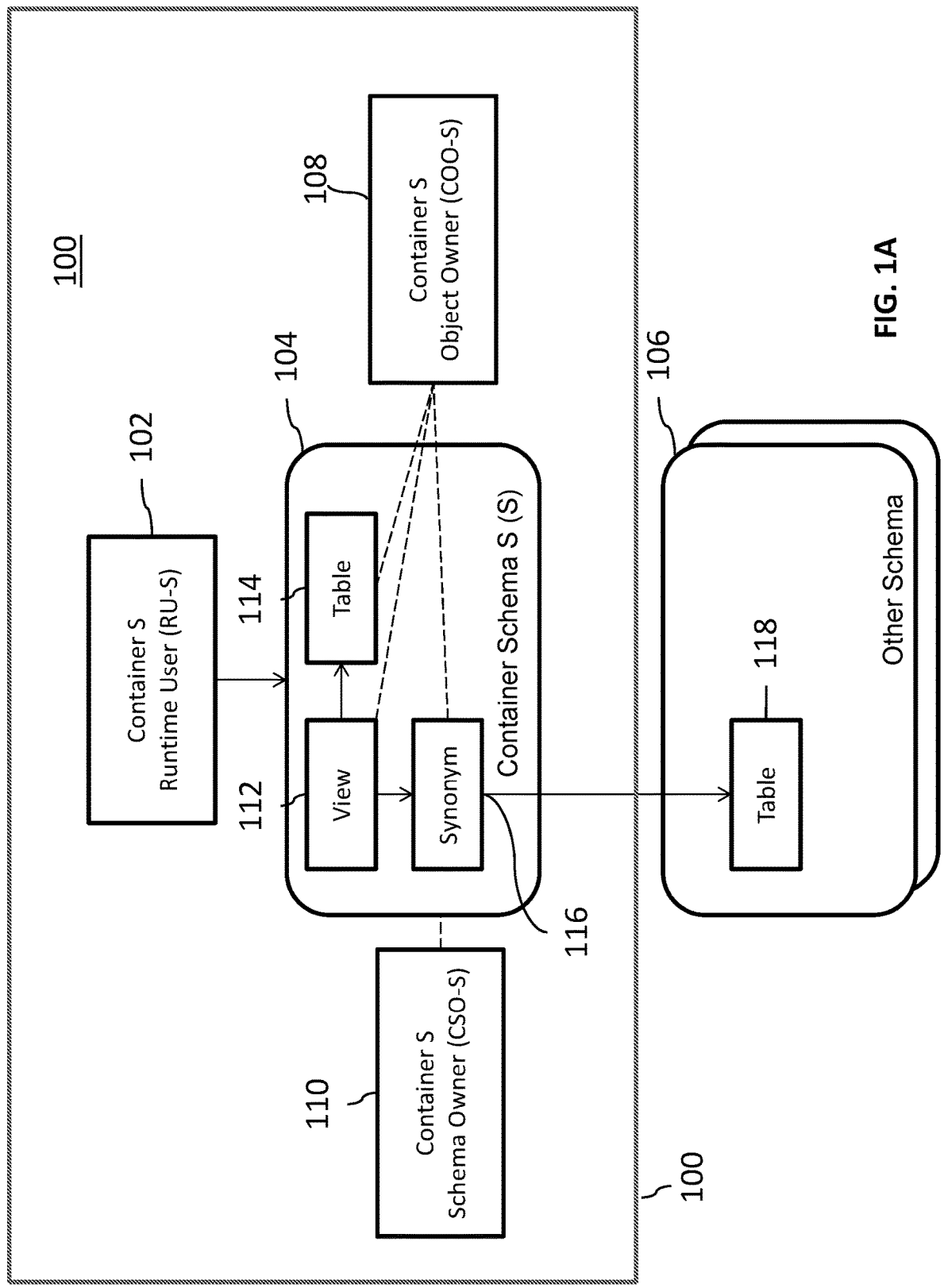
FIGS. 1A, 1B, and 1C illustrate examples of containers for database schemas, according to some implementations of the current subject matter.

FIG. 1A illustrates an example of a container 100 for a database schema, according to some implementations of the current subject matter. The container 100 artifacts may include an identity of the container runtime user(s) 102 (e.g., a container S runtime user ("RU-S")), a container schema 104 (e.g., container S schema ("S")), an identity of the container object owner(s) 108 (e.g., container S object owner ("COO-S")), and/or an identity of the container schema owner(s) 110 (e.g., container S schema owner ("CSO-S")).

In the example of FIG. 1A, the container schema 104 may define one or more objects, which in this example include a view object 112, a table object 114, and a synonym object 116, although other objects and/or artifacts may be defined as well for the database. As noted above, the containers are isolated from each other, so container 100 cannot be accessed by other containers. However, the container 100 may access container 106 via a linking (or alias) object, such as a synonym 116. The synonym 116 may link the container 100 to another schema at, for example, another container 106, which in this example includes a table 118.

Figure 1B:
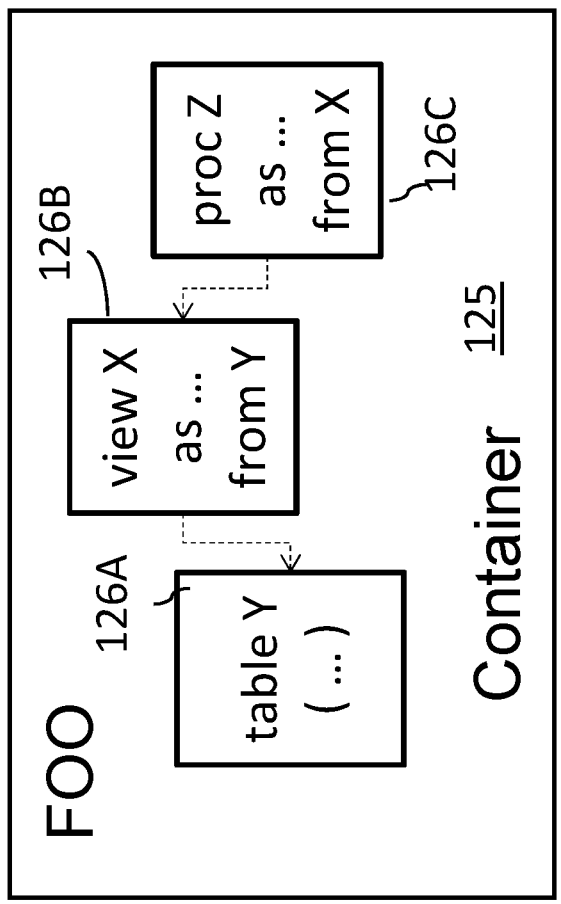

FIG. 1B depicts another example of a container 125. In the example of FIG. 1B, the container 125 defines objects, such as database objects 126A-126C. In this example, the first database object 126C is a procedure Z, which depends on the second database object (view X) 126B, which depends from the third database object (table Y) 126A. In this example, the deployment infrastructure (DI) deploys the container 125 and makes the runtime objects 126A-C in a proper order, so in this example, the table 126A must be a runtime object in existence before the database object for the view 126B is instantiated, and in this example the procedure Z 126C is the last object to be made by the DI as a runtime object.

As noted, the DI may be a service layer of a database or cluster of databases, so the DI may be called or accessed via an interface of the DI. The DI may provide a declarative approach for defining database objects (and/or artifacts) such that the objects (and/or artifacts) are deployed to make runtime objects consistently (e.g., in a proper order, with proper dependencies, and the like). Table 1 depicts a simple, partial example of a declarative approach for defining the database objects of FIG. 1B. In the example of Table 1, the objects 126A-C are defined using a file or a script, which can be stored and re-used to enable multiple deployments. In short, the DI may be used to deploy the container including the script to make the objects of the database to ensure a consistent deployment into the database.

TABLE 1 com.sap.hana.example/
|- src/
||- A.view
||- B.table
||- C.proc

When the DI is used to deploy the container, the objects are made for the database runtime. If there is a subsequent change to one of the objects, such as table 126A (e.g., an addition or deletion of a column in table Y. the DI may monitor for changes and detect (e.g., revalidate the objects) the change to table Y, and, if needed, may redeploy the objects associated with (e.g., which depend on) table Y 126A, which in this example corresponds to redeploying view X 126B and/or procedure Z 126C.

Figure 1C:
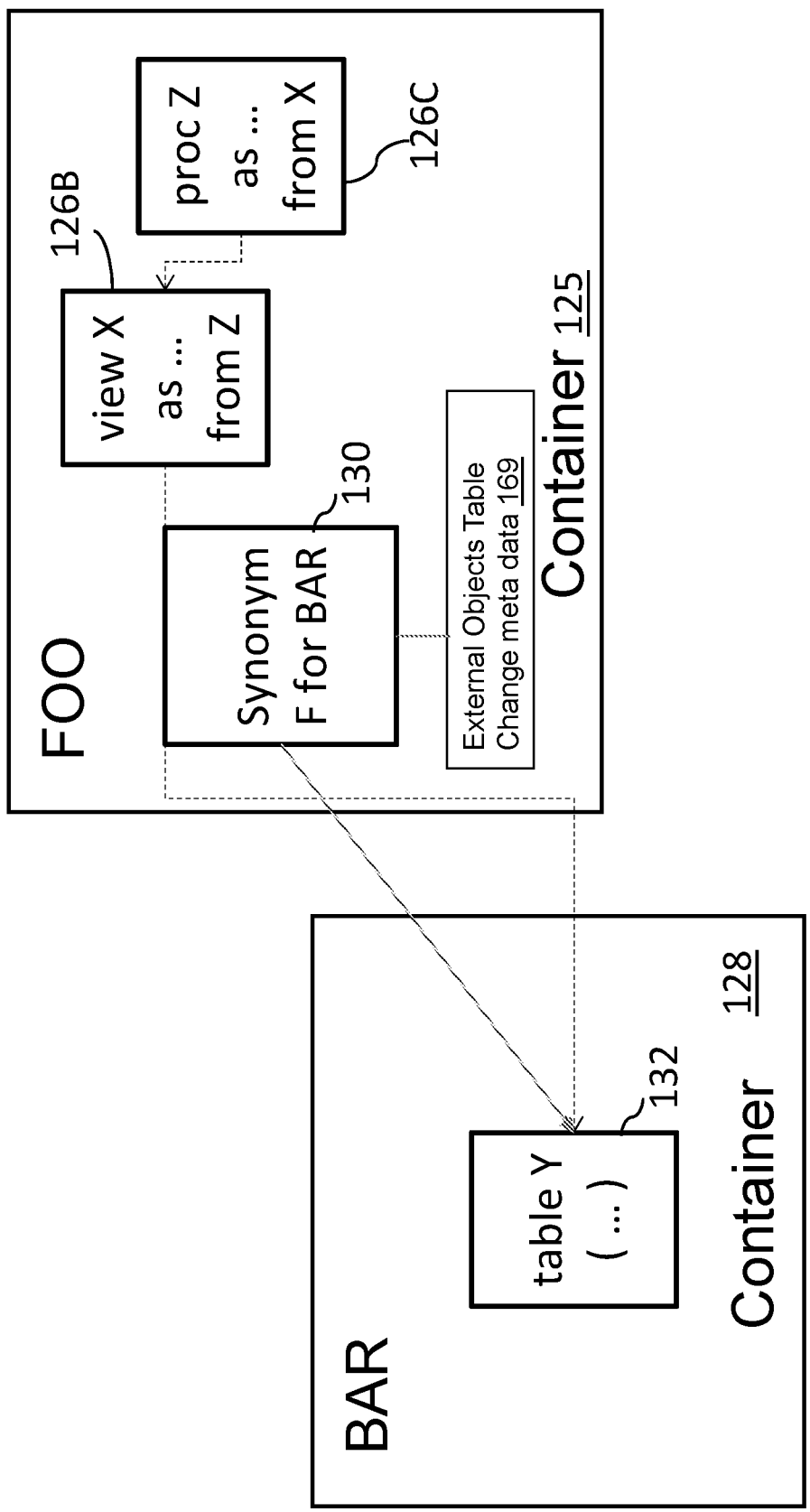

Moreover, the containers may, as noted, be isolated against each other by database mechanisms, such that each container (which provides a database schema) with its deployed objects is owned by a per-schema (and/or container) technical user. FIG. 1C depicts two containers 125 and 128. In this example, the containers 125 and 128 have different owners and these containers cannot access each other's contents or runtime objects as containers 125 and 128 are isolated from each other. At FIG. 1C, the view X 126B of the container 125 needs to access at least a portion of table Y 132 at container US. Because table Y is in another container 128, container isolation prevents container 125 from directly accessing container 128, which provides access to table Y. To enable this access in the Container-isolated environment, the DI provides the synonym 130 object. The synonym acts as an alias or link to a table and/or a view in another schema provided by another container, such as container 128. In the case of the synonym F 130, the owner of container 128 may grant access to table Y to the owner of container 125. When the DI is used to deploy container 125 and container 128, each of these container schemas is separately deployed with container isolation. However, the dependencies linking (or pointing to) the database objects is preserved via the synonym 130. For example, the containers may be isolated against each other by database mechanisms (e.g., each database schema with its runtime objects is owned by a different database user). As such, none of these per-schema users have any privileges on runtime objects of another schema by default for example, and privileges need to be granted explicitly. Moreover, DI database artifacts may be written in a schema-free way (e.g., so no explicit schema references) to allow deployment of the same database objects into different containers. References to schema-external objects may need to be created via synonyms, which are bound during deployment. The synonyms provide schema-local names for the schema-external objects.

If there is a change to table Y at container 128, the container 125 may not detect the change. in other words, the DI for container 125 (and the corresponding database) may view that the database objects for synonym F, view X, and procedure Z are unchanged and still valid, so the DI may be unaware of the change to table Y or a need to revalidate and redeploy objects, such as view X 126B and procedure Z 126C since that change is at another container 123 (for another database or database schema). For example, if a column is deleted from table Y, this can affect view X and procedure Z, but from the perspective of the DI for container 125 everything is consistent and operating properly despite the error caused by the modified table Y.

In some example embodiments, during a make (e.g., build or create of the executable objects of the database), the DI may be configured to check to see when a referenced external object in another container (and/or in another non-container schema) has last been modified. Based on this check, the DI may then redeploy one or more objects. If for example, an object ID of an extern& object and/or or version of an external object has changed, one or more objects may be redeployed.

To illustrate further with an example, given that a column is deleted from table Y 132, this may cause metadata related to table Y to change (e.g., an object ID, version timestamp, or other indication of the change). When the DI for container 125 checks its objects, it sees a synonym F 130 linked to table Y 132. In this example, the external objects table 169 may include metadata for table Y. This metadata may include prior metadata for table Y a prior object ID, a prior version ID, a prior timestamp, or other indication prior to the change to table Y). Thus, the DI for container 125 can detect that the external object (which in this example, is table Y 132) has changed as the current metadata for table Y has changed (e.g., when compared to the prior metadata. for table Y). Based on this check. the DI for container 125 may redeploy dependent objects 126B. 126O, and object 130 in container 125 (as the object for table Y. has already been changed at container 128 there is no need to redeploy table Y). And, the metadata at 169 for table Y is updated (so it includes the more current metadata for table Y, for example).

In some implementations, the DI may check, for one or more synonyms (or other linking objects such as a projection view or virtual table) within the container 125 for changes as part of, for example, revalidation of the container. The revalidation of external dependencies may be enabled by a validation parameter. The validation parameter may be set as a container configuration parameter or may be passed as a parameter with every make, where a revalidation is desired. The DI (e.g., deployer server or deployment process(es)) may be configured to pass-through this validation parameter.

Before providing additional examples of the DI check noted above, the following provides additional examples and/or description related to the deployment infrastructure and containers.

Figure 2:
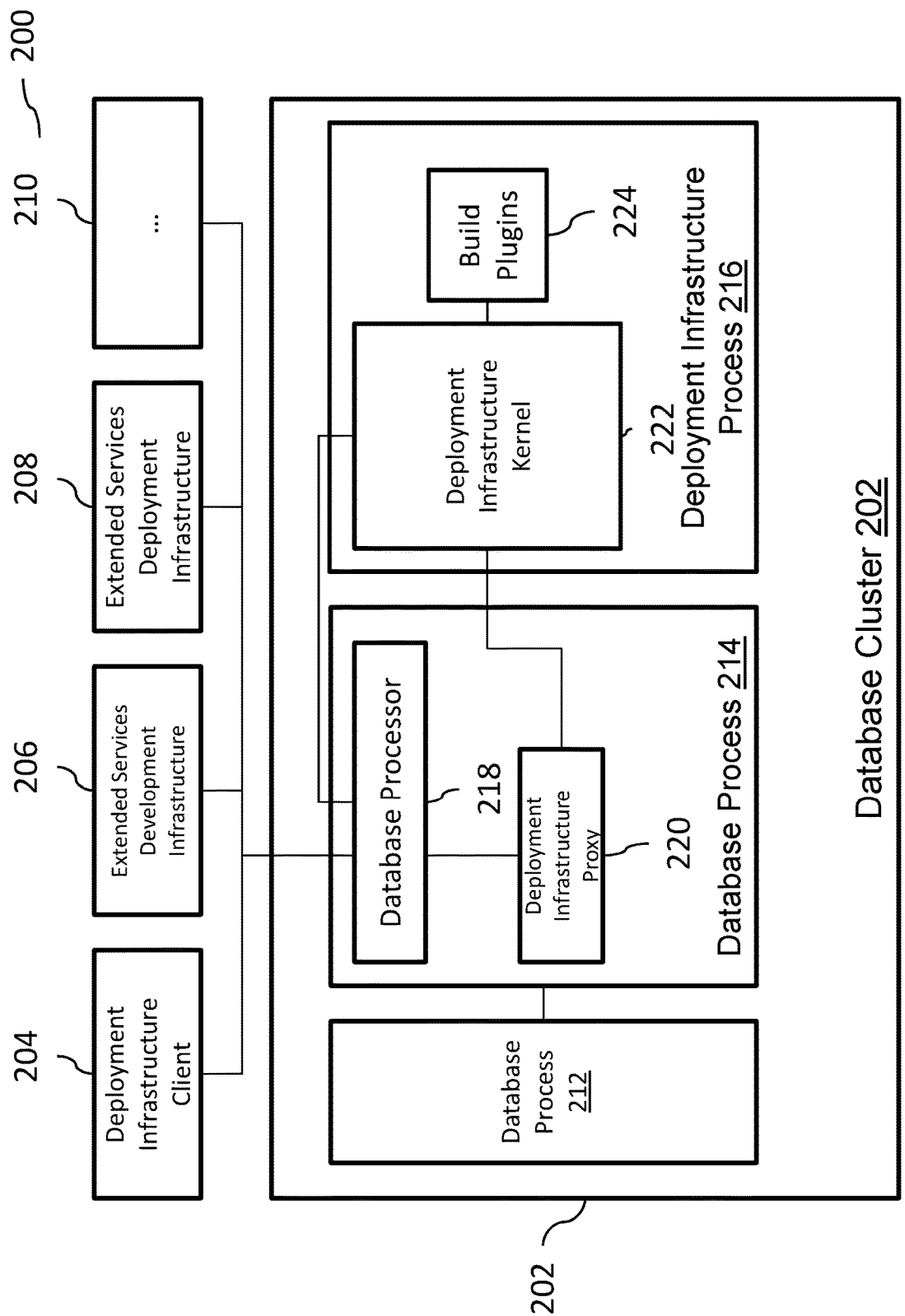
FIG. 2 illustrates an example of a system including a deployment infrastructure (DI), according to some implementations of the current subject matter.

FIG. 2 illustrates an example of a system 200 that can implement a deployment infrastructure (DI), according to some implementations of the current subject matter. The system 200 may include one or more of the following: a database cluster 202 (e.g., a HANA cluster or other type of database cluster), a deployment infrastructure client component 204, an extended services development infrastructure component 206, an extended services deployment component 208, as well as any other components 210 that can be communicatively coupled with the database cluster 202. The components 204-210 can represent technical users (e.g., their corresponding devices) that can access the database cluster 202 using, for example, a structured query language.

The database cluster 202 can include various database processes 212, 214 (e.g., database processes), each having a design-time and runtime persistence components. As shown in FIG. 2, the database process 214 can include a database processor 218 (e.g., an SQL processor) that can be communicatively coupled to a deployment infrastructure proxy component 220. The deployment infrastructure proxy component 220 can be communicatively coupled to a deployment infrastructure process 216. The deployment infrastructure process 216 can include a deployment infrastructure kernel 222 and at least one design-time build plugin component 224.

In some implementations, the technical users 204-210 can access the deployment infrastructure proxy component 220 via the database processor 218. The proxy component 220 then communicates with the kernel 222 via a network protocol connection. The kernel 222 accesses design-time build plugin(s) 224 to generate, create, and/or modify various objects, which are then supplied by the kernel to the database processor 218 and can, thereafter, be persisted by the database processor 218.

In some implementations, the system 200 can provide an SQL-based API for the deployment infrastructure that can be accessed via a standard SQL connection, where the API can be exposed at the SQL layer. As shown in FIG. 2, the system 200 can represent the system's target architecture for the deployment infrastructure in order to provide the API at the SQL layer and keep the deployment infrastructure kernel 222 and the deployment infrastructure design-time build plugin(s) 224 isolated in its own operation system process.

For the purposes of decoupling, the deployment infrastructure can provide database procedures for its APIs. Communication from the database process 214 (e.g., an hdbindexserver or the like) towards the deployment infrastructure process 216 (e.g., an hdbdiserver or the like) can be provided via a deployment infrastructure proxy library which can be loaded into the database process 214. This proxy can implement database procedures and/or client-side of a deployment infrastructure network protocol. Some, if not all, incoming requests can be routed to the deployment infrastructure process using this network protocol. In some implementations, the components 222 and 224 can also be inside the database process 214.

The deployment infrastructure process 216 can communicate to the database process 214 via an internal application programming interface (e.g., a thin layer SQL client) on a new database transaction. This new transaction is not related to the database transaction in which the deployment infrastructure command is sent to the database process 214. The SQL communication from deployment infrastructure towards the database process 214 can be a trusted communication that can allow deployment infrastructure to execute SQL statements on behalf of different technical users inside a single database transaction in order to implement different security features at the database layer.

Referring back to FIG. 1B, the view 126B can be associated with a view plugin that can transform a design-time view resource into a SQL view object, such as a database object. In some exemplary implementations, the file format can use a data definition language ("DDL")-style syntax, which can be equivalent, for example, to the corresponding CREATE VIEW SQL syntax (without the "CREATE"). This can include support for column views of TYPE HIERARCHY if the query is provided as a SQL query. If the view selects from a synonym which points to an object inside another schema or different container or to an object inside the same container which is owned by a different user, then the container's object owner can be granted the required privileges on the target object, e.g., SELECT, UPDATE, INSERT, in order to access the object. For views, the object owner can also have WITH GRANT OPTION privileges (if the views are exposed to other users).

In some implementations, the deployment infrastructure (DI) can have at least one view plugin, which can include at least one of the following: a calculation view plugin, a projection view plugin, and/or any other view plugins. The calculation view plugin can transform a design-time calculation view description into a set of view database objects. The projection view plugin can transform a design-time projection view resource into a projection view database object. A projection view configuration resource can contain a binding from the projection view to a target database, a target schema, and/or a target object (similar to synonyms, as discussed below). The definition of a projection view can include two design-time files: a projection view file (with an optional default configuration) and an explicit configuration of the projection view's target. The explicit configuration can be provided at deployment time, overriding an optional default configuration. The format of the projection view file can use a DDL-style syntax which can be equivalent to the corresponding CREATE PROJECTION VIEW SQL syntax (without the "CREATE"). The FROM clause of the PROJECTION VIEW definition can define the default configuration. A projection view configuration file can contain multiple configurations. If the "schema" of a target description is left out, then the projection view can point to a container-local object. In this case, the referenced object can be considered as a deployment dependency. If the projection view points to an object inside another schema or different container or to an object inside the same container, which is owned by a different user, then the container's object owner can be granted the required privileges on the target object, e.g., SELECT, UPDATE, INSERT, in order to access the object.

The deployment infrastructure can also include a table plugin that can transform a design-time table resource into a table database object. The file format can use a DDL-style syntax, which, in some exemplary implementations, can be equivalent to the corresponding CREATE TABLE SQL syntax (without the "CREATE"). Tables can have at least two types: ROW and COLUMN. A table can be self-contained. In some implementations, a table cannot reference another table. The deployment infrastructure can include a virtual table plugin that can transform a design-time virtual table resource into a virtual table database object. The target database where the virtual table points to needs to be available via a database remote source. A definition of a virtual table can include two design-time files: a virtual table file (with an optional default configuration) and an explicit virtual table configuration that contains the binding from virtual table to remote source, target database, target schema, and/or target object. The explicit configuration can be provided at latest at deployment time, overriding the optional default configuration. An administrator can map object references according to the deployment context. In some implementations, the file format can use a DDL-style syntax which is equivalent to the corresponding CREATE VIRTUAL TABLE SQL syntax (without the "CREATE"). The container's object owner can be granted the CREATE VIRTUAL TABLE ON REMOTE SOURCE privilege on the remote source in order to access the remote source.

The synonym objects 130 (or table links) can allow referencing of schema-external objects. The synonym can include two design-time files: a declaration (with an optional default configuration) and an explicit configuration of the synonym's target. The explicit configuration can be provided at deployment time and can override an optional default configuration. Hence, an administrator can map object references according to the deployment context. Table 2 below depicts an example of a synonym definition and configuration. In the example of Table 2, the synonym definitions use the content of the associated "target" objects as a default configuration.

TABLE 2

```
{
    "<synonym 1>" : {
        "target": {
            "database" : "<the target database>", // optional
            "schema" : "<the target schema>", // optional
            "object" : "<the target object>"
        }
    },
    "<synonym 2>" : {
        "target": {
            "database" : "<the target database>", // optional
            "schema" : "<the target schema>", // optional
            "object" : "<the target object>"
        }
    },
    <...>
}
```

Figure 3:
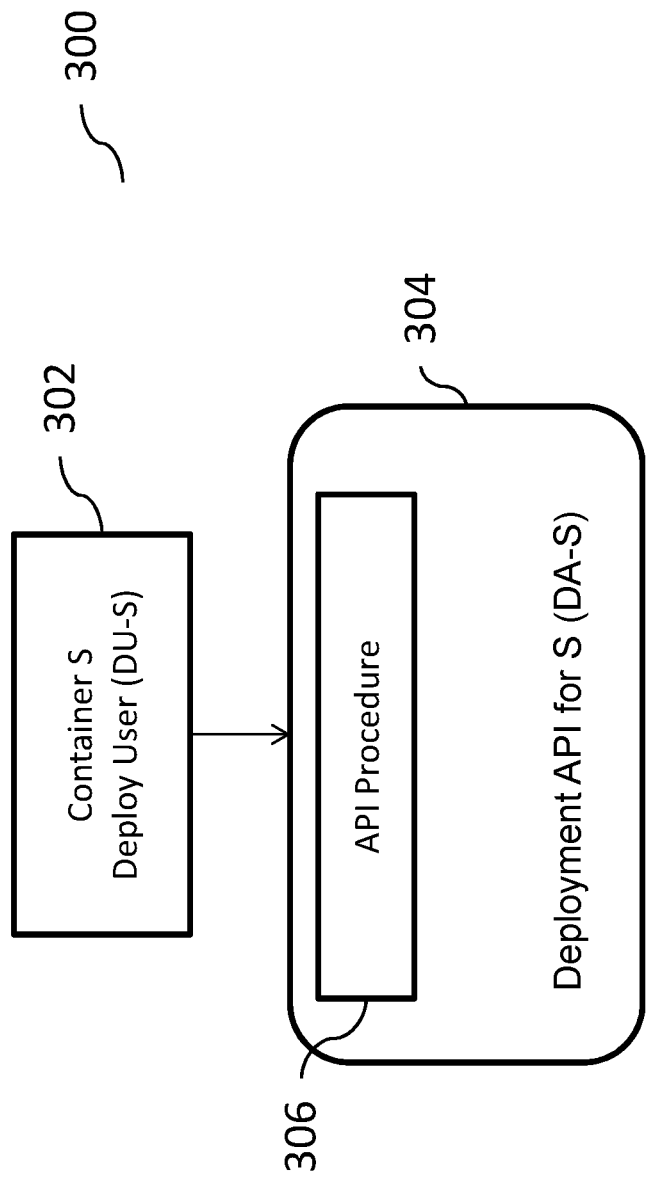
FIG. 3 illustrates an example of a deployment API, according to some implementations of the current subject matter.

To perform container management and deployment, the deployment infrastructure (DI) can use two kinds of APIs. One of the APIs can include a higher-level privileged container management API that can allow creation and/or deletion of schema-based containers. The other API can include a container-level deployment API that can allow applications and/or tools to deploy/un-deploy artifacts within a container. FIG. 3 illustrates an exemplary deployment API system 300, according to some implementations of the current subject matter. The system 300 can include a container deployment user 302 (e.g., container S deploy user ("DU-S")) and a deployment infrastructure's deployment API 304 (e.g., deployment API for S ("DA-S") for a container (e.g., container 125, as shown in FIG. 1C)). The deployment API 304 can include one or more API procedures 306. In some implementations, a deployment API can be paired to a container schema and can allow write/read design-time artifacts, trigger deploy/undeploy actions.

Figure 4:
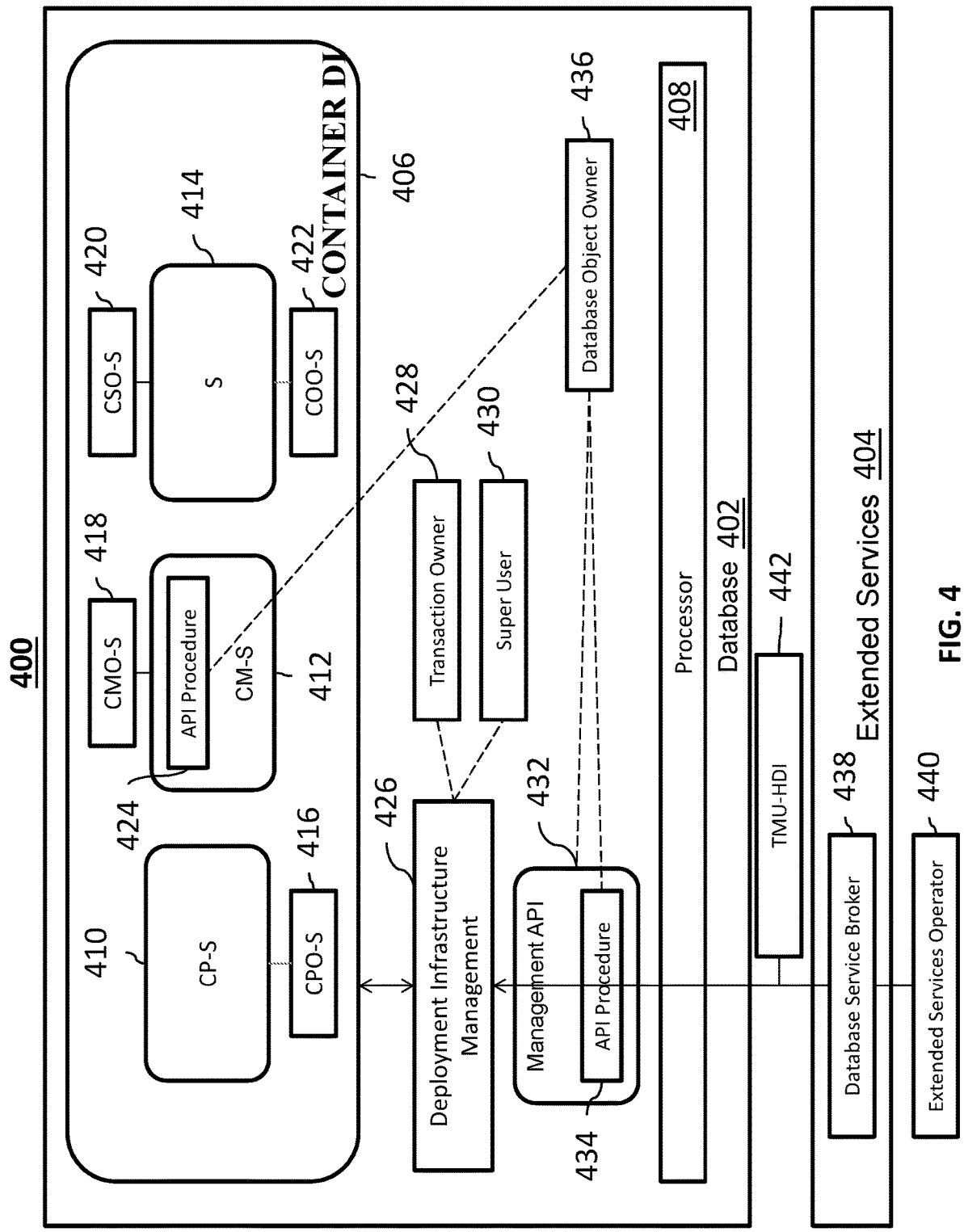
FIG. 4 illustrates an exemplary system for performing deployment infrastructure administration and container management, according to some implementations of the current subject matter.

FIG. 4 illustrates an example of a system 400 for performing deployment infrastructure administration and container management, according to some implementations of the current subject matter. Container management can be performed using one or more APIs, which can include one or more database procedures that can be executed via a central database schema for the deployment infrastructure (DI): SYS DI. Some of the procedures for performing container management can include creation/dropping of a container, granting/revoking of privileges on a container scheme (e.g., schema S), granting/revoking privileges on the container deployment API:

_SYS DI.CREATE_CONTAINER (creation of a container);
_SYS DI.DROP_CONTAINER (dropping a container);
_SYS DI.GRANT_CONTAINER_SCHEMA_PRIVILEGE (granting container schema privilege);
_SYS_DI.REVOKE_CONTAINER_SCHEMA_PRIVILEGE (revoking container schema privilege);
SYS DI.GRANT_CONTAINER_API_PRIVILEGE (granting container API privilege); and/or
_SYS_DI.REVOKE_CONTAINER_API_PRIVILEGE (revoking container API privilege).

An example of a grant of privileges on the container schema S can include a call _SYS_DI.GRANT_CONTAINER_SCHEMA_PRIVILEGE ('S', 'SELECT', 'RUNTIME_USER_S'). An example of a grant of a role on the container schema S can include a call of _SYS_DI.GRANT_CONTAINER_SCHEMA_ROLE ('S', 'A_ROLE_XYZ', 'SOME_USER'). An example of a grant of a privilege (e.g., WRITE, READ, MAKE) on the container S deployment API can include calls _SYS_DI.GRANT_CONTAINER_API_PRIVILEGE ('S', 'WRITE', 'EXECUTE', 'DEPLOY_USER S'); _SYS_DI.GRANT_CONTAINER_API_PRIVILEGE ('S', 'READ', 'EXECUTE', 'DEPLOY_USER S'); and _SYS_DI._GRANT_CONTAINER_API_PRIVILEGE ('S', 'MAKE', 'EXECUTE', 'DEPLOY_USER S'), respectively.

In some implementations, at installation time of the deployment infrastructure (together with underlying database appliance), the management schema _SYS_DI, its content, and all internal deployment infrastructure system users can be created. Additionally, for bootstrapping of privileges, execute rights on these procedures (and/or select privileges on additional monitoring views, etc.) can be granted to the default administration user of the database with GRANT OPTION.

Referring to FIG. 4, the system 400 can include a database 402 (e.g., HANA or other type of database) communicatively coupled with extended services 404, which can be accessed by an extended services operator 440. The database 402 can include a container deployment infrastructure 406, a processor 408, a deployment infrastructure management component 426, and a management API 432. The container (e.g., container S) deployment infrastructure 406 can include deployment infrastructure plugin metadata for container S ("CP-S") 410 along with an associated container S plugin metadata owner(s) ("CPO-S") 416, a deployment infrastructure metadata and deployment API 412 for container S, including API procedure(s) 424, along with an associated container S metadata owner ("CMO-S") 418, and a deployment schema/container ("S") 414 along with container S schema owner ("CSO-S") 420 and container S object owner ("COO-S") 422 (which can have CREATE ANY privileges on the schema S). The container S can include one or more artifacts, objects, etc., as discussed above. The users 416, 418, 420, 422 are technical users. The deployment infrastructure management 426 can also be communicatively coupled with a deployment infrastructure transaction owner _SYS_DI_TO 428 and deployment infrastructure super user _SYS_DI_SU 430 (which has all privileges). The database 402 can also include a deployment infrastructure management API 432 having API procedure(s) 434 and a deployment infrastructure database object owner 436 that can be communicatively coupled with the management API 432, the API procedure(s) 434 as well as the API procedure(s) 424.

In some implementations, an administrator can create a deployment infrastructure technical management user ("TMU-HDI") 442 and grant execute rights on the above procedures (e.g., create container, drop container, grant privilege, etc.) to the management user 442. The database service broker 438 of the extended services 404 can use the management user 442 to create/alter/drop containers and/or grant/revoke privileges to/from users. More than one management user can exist in the system 400, and the privileges can be assigned to various roles and/or various roles can be assigned to users. Further, grant/revoke database procedures can be provided which can support user privileges on the SYS DI schema and/or a container's metadata schemata.

In some implementations, when creating a container, the system 400 can implement the following procedures. On creation of a container schema S, the deployment infrastructure can create the technical container schema owner CSO-S 420, the container schema S 414, the container object owner COO-S 422, the metadata and deployment API companion schema CM-S 412, and a set of plugin metadata companion schemata CP-S 410 with corresponding owner users CPO-S(s) 416. The metadata schema CM-S 412 can be used for storing file artifacts and/or keeping track of active files. The container-specific plugin metadata schemata CPO-S(s) 416 can be used for build-plugin-specific metadata that can be used during deployment. In some implementations, technical container users (i.e., users 410, 416, 418, 422, 428, 430, 436) can only be used internally by the deployment infrastructure and can be created as restricted database users without an ability to log-on to the database. The users also own their corresponding objects in the deployment infrastructure. In some implementations, the container object owner COO-S 422 can be used for creating database objects inside the container schema S 414. For example, the user 422 can have CREATE ANY privileges on the container schema S 414 and the _SYS_DI_OO_DEFAULTS role. This way, the database objects are owned by a system-internal technical user and are not bound to the lifetime of externally owned users that trigger the deployment of artifacts. Additionally, the deployed database objects do not inherit database privileges from the deploying users. The _SYS_DI_OO_DEFAULTS role can give privileges on standard database objects, e.g., objects in SYS like SYS.DUMMY. The _SYS_DI_OO_DEFAULTS role can be a deployment infrastructure specific variant of the PUBLIC role (which can have a plurality of privileges) with a minimal set of object privileges that every container object owner can have.

In some implementations, once containers are created, they can be provided with a particular name in accordance with a container naming scheme. For example, container names can have a maximum size of 64 characters and can contain characters A to Z, numbers 0 to 9, and an underscore character "_", and/or any other characters. The name of the container schema S 414, the name of the deployment API and metadata schema CM-S 412, and the name of the container object owner COO-S 422 can be visible to administrators and/or end-users. Thus, as shown in FIG. 4, they can be named "S", "S#DI", and "S#OO". All other internal users and internal schemata can use a prefix "DI#S#" to allow to group and/or hide them in tools/queries/etc.

Figure 5:
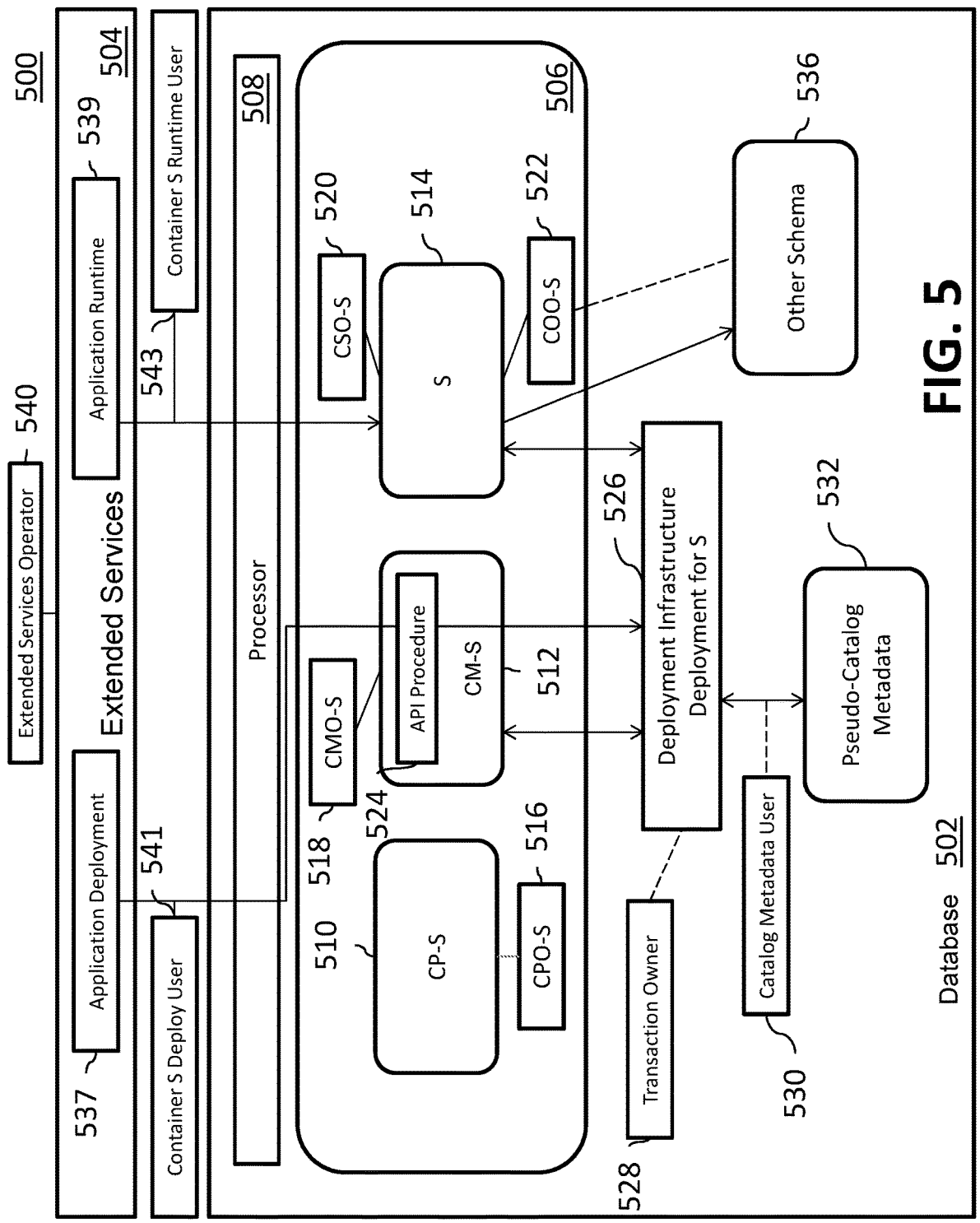
FIG. 5 illustrates an exemplary system having container-level deployment application program interfaces, according to some implementations of the current subject matter.

FIG. 5 illustrates an example of a system 500 having container-level deployment application program interfaces, according to some implementations of the current subject matter. The system 500 can include a database 502 (e.g., HANA or other type of database) communicatively coupled to extended services 504, which in turn, can be accessed by the extended services operator 540. The extended services user 540 can perform various functions, including, for example, install, upgrade, scale, etc. The extended services 504 can include an application deployment component 537 and an application runtime component 539, which can be used for deployment and runtime of an application, respectively.

The database 502 can include a processor (e.g., an SQL processor) 508, a container deployment infrastructure 506, in addition to deployment infrastructure for deployment of a container (e.g., container S) 526, a pseudo-catalog metadata (e.g., _SYS_DI_BIMC*) 532, and various other schema (e.g., other application schema, ERP schema, etc.) 536. The container (e.g., container S) deployment infrastructure 506 can include deployment infrastructure plugin metadata for container S ("CP-S") 510 along with an associated container S plugin metadata owner(s) ("CPO-S") 516, a deployment infrastructure metadata and deployment API 512 for container S, including API procedure(s) 524, along with an associated container S metadata owner ("CMO-S") 518, and a deployment schema/container ("S") 514 along with container S schema owner ("CSO-S") 520 and container S object owner ("COO-S") 522 (which can have CREATE ANY privileges on the schema S). In some implementations, the container object owner 522 can also receive access rights (e.g., explicitly granted by a third party) to other application schema component 536. The users 516, 518, 520, 522 can be technical users in accordance with the description above.

In some implementations, the application deployment component 537 can be associated with a container S deploy user ("DU-S"), which can generate various calls (e.g., CALL DA-S.WRITE ( . . . ), CALL DA-S_MAKE( . . . ), etc.) to the processor 508. Similarly, the application runtime component 539 can be associated with a container S runtime user ("RU-S"), which execute various procedures (e.g., SELECT, INSERT, etc.) during runtime of an application, where the execution calls can be sent to the processor 508 for processing.

During deployment, calls issued by the application deployment component 537 can be passed on to the API procedure component 524 in the deployment infrastructure's metadata and deployment API component 512. The CM-S component 524 can further pass the call to the deployment infrastructure's deployment component 526. The deployment component 526 can exchange metadata updates and perform file staging updates using metadata object owner ("MOO-S") and/or container metadata schema owner ("MSO-S"), which can be other technical users in the system 500. The metadata can be container-specific metadata (e.g., design-time container ("DTC")) and can include information concerning design-time artifacts, data dependencies and/or build plugin metadata, as well as any other information. The deployment component 526 can also communicate with the deployment schema container component 514 to perform deployment/un-deployment of schema/container using COO-S 522. The component 526 can further be controlled by the transaction owner component 528 (another technical user). In some implementations, the component 526 can also exchange pseudo-catalog metadata updates with the pseudo-catalog metadata component 532 using catalog metadata user 530 (e.g., using _SYS_DI_*CATALOG).

In some implementations, the deployment infrastructure can be used to deploy artifacts and/or objects in a particular order. The deployment of objects can be based on dependencies between objects in the target model. The order of deployment of artifacts can be based on information about database runtime objects, which can be provided by an artifact and/or which can be required by an artifact. Using this information, a dependency graph can be created, which can connect object providers to corresponding object consumers.

Figure 6:
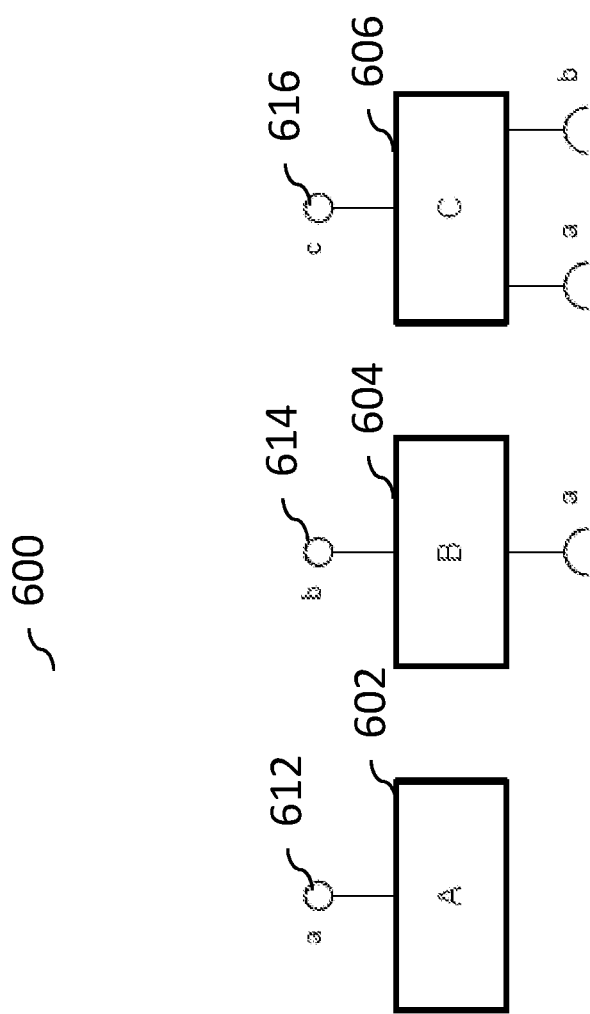
FIG. 6 illustrates an example of a graph of artifacts and objects, according to some implementations of the current subject matter.

FIG. 6 illustrates an exemplary graph 600 of artifacts and objects, according to some implementations of the current subject matter. The graph 600 can include artifacts A 602, B 604, and C 606. The artifact A 602 can provide an object a 612; artifact B 604 can provide an object b 614; and artifact C 606 can provide an object c 616. Additionally, artifact B 604 can require object a 612, and artifact C can require objects a 612 and b 614. The artifacts and objects can be tables, views, procedures, etc. that can be contained in the database. For example, a table requiring insertion of additional fields, columns, etc. can be deployed by defining a table (e.g., table A definition), defining a view (e.g., view B definition), uploading the definitions into the deployment infrastructure, and deploying table A and view B. This process can also involve determining any dependencies that may be required (e.g., objects that the table may require, objects on which the view may depend, etc.). The plugins can be used to determine the order of deployment of the table A and view B. In some implementations, the artifacts can have various types. In some cases, the three artifacts 602-606 can have the same artifact type (A=B=C), or three different types (A≠B≠C and A≠C), or two different types (A=B≠C, A≠B=C, or A=C≠B). In some implementations, a single build plugin can handle all artifact types. Alternatively, different build plugins can handle different artifact types.

Figure 7:
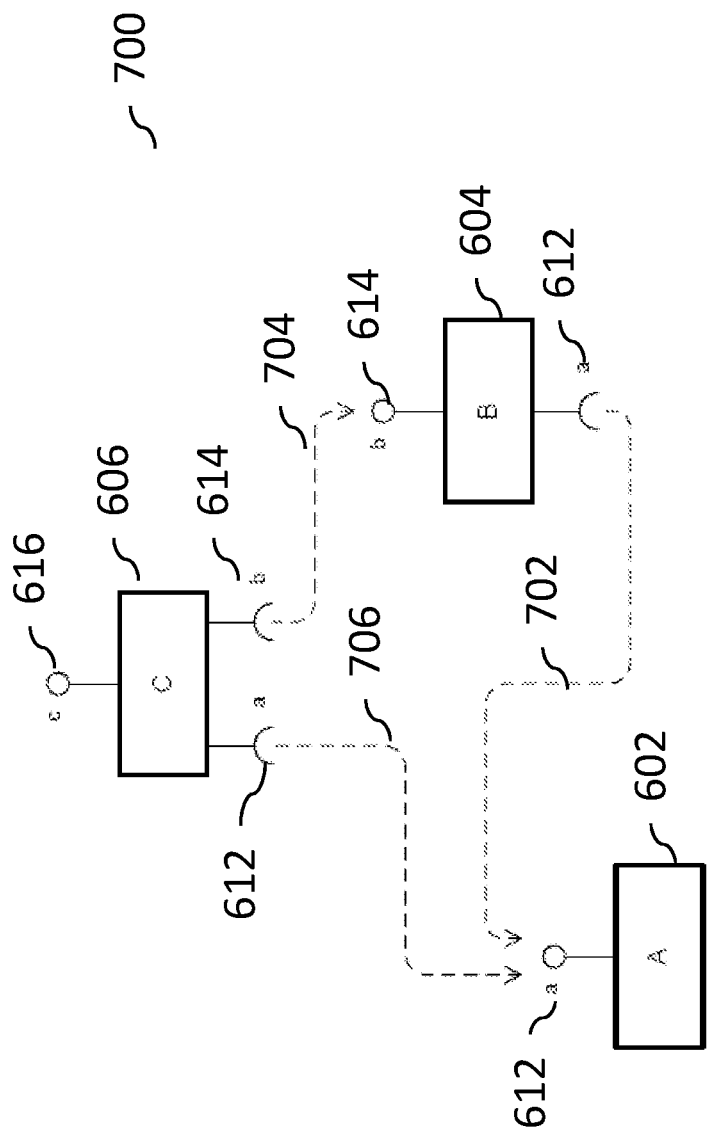
FIG. 7 illustrates exemplary dependencies between objects, according to some implementations of the current subject matter.

FIG. 7 illustrates an exemplary dependency graph 700, according to some implementations of the current subject matter. The graph 700 is based on the artifacts 602-606 and objects 612-616 shown in FIG. 7. As shown in FIG. 7, dependency 702 illustrates a dependency between artifacts A 602 and B 604, i.e., artifact B requires object a. Dependency 704 illustrates a dependency between artifacts C 606 and B 604, i.e., artifact C requires object b. Dependency 706 illustrates a dependency between artifacts C 606 and A 602, i.e., artifact C requires object a. Artifact A does not depend on any other artifact.

Figure 8:
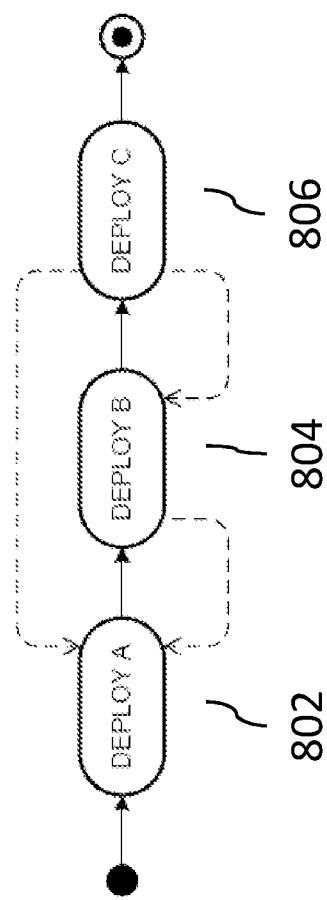
FIG. 8 illustrates an exemplary execution graph for deployment of dependent objects, according to some implementations of the current subject matter.

FIG. 8 illustrates an exemplary execution graph 800, according to some implementations of the current subject matter. The execution graph 800 is generated based on the dependency graph 800 shown in FIG. 8 and illustrates an initial deployment of the three artifacts A, B, C, shown FIG. 8. As shown in FIG. 8, the first deployment 802 ("DEPLOY A") involves deploying artifact A 802. The second deployment 804 ("DEPLOY B") involves deploying artifact B 804. The third deployment 806 ("DEPLOY C") involves deploying artifact C 806.

In some implementations, the deployment process of artifacts can be modified by receiving a modified version of an artifact or undeploying an old artifact and receiving a modified artifact. Using the first or the "DEPLOY" strategy, the build plugin can receive a modified, new version of the artifact and thus, can react accordingly. For example, the build plugin can issue ALTER statements to the database.

Using the second or "UNDEPLOY-DEPLOY" strategy, the old artifact can be undeployed and the build plugin receives the modified, new version of the artifact for deployment. In some implementations, modification strategies can be combined. Similar process can be applicable to revalidation of artifacts which can occur when artifacts that provide required objects are modified (or revalidated).

In some example embodiments, the DI may be configured with a process, which is called during a make (e.g., build or generation of runtime execs able objects) from the artifacts in a container. For example, if a validation parameter is set to "true" (e.g., in a file or metadata associated with the container or as a parameter passed directly to a procedure), the validation parameter may indicate that at least one object needs to be redeployed because of at least one change to at least one dependent external object, although the procedure may determine no external object has changed. The at least one object may then be handled as "requiring revalidation" and/or added to a set of one or more objects to be revalidated (e.g., re-deployed via the DI into an executable object at the database). As noted, other objects that depend from the at least one object may also require revalidation, and thus may also be flagged as "requiring revalidation" and/or added to a set of one or more objects to be revalidated.

Referring again to FIG. 1C, the DI for container 125 may call a procedure that determines at least one object which is external (and as noted above isolated) to container 125 that triggers a redeployment due to a change to a dependent external object, such as table Y 132 at container 128. For example, objects 130, 126B, and 126C are redeployed as object 130 is determined to have the changed external dependency and thus marked as requiring revalidation. To illustrate further, due to the change to object 130, object 126B is marked for revalidation, and then object 126C is marked for revalidation due to the change to object 126B. The object 130 and/or object 132 may then be handled as requiring revalidation and/or added to a set of one or more objects to be revalidated (e.g., re-deployed to form an object for execution at the database). Likewise, objects 130 and/or 126B-C (which depend from the object 132) may also be flagged as requiring revalidation and/or added to a set of one or more objects to be revalidated.

For the DI to be able to determine whether external object changes occur, the DI may need to save metadata for these external objects. For example, the metadata may be saved in a table, such as table 169 or saved in another mechanism or location, in the persistency of container 125. To illustrate further, the external objects table 169 may store metadata for one or more external objects, such as table 132, to be able to detect changes to the external objects. After the deployment of the objects 126C, 126B, and synonym 130 (or, for example, a projection view or another objected with a link or reference point to an object outside the container), the DI may save, for the synonym 130, the metadata related to the external object, such as table and/or its container 128, in the external objects table 169. For the synonym 130 and container 128, the DI may persist in the external object table 169 metadata about the external object 132 and/or container 128 that enables identification of changes to table 132. This metadata may include an object ID of the external object (e.g., object ID of table 132) and/or a version ID of the external object (e.g., version ID of table 132). If the container 125 includes a plurality of synonyms, the external objects table may include, for each synonym, the identity of the external object and metadata for those objects to enable change detection. In the case of a virtual table being used in container 125 to link to another container, the DI may not need to save change information for the external objects but instead query of a check virtual tables service.

In the example of the synonym 130 of FIG. 1C for example, the external objects table 169 may be created as shown in Table 3 below.

TABLE 3

COLUMN TABLE EXTERNAL_OBJECTS (
   SYNONYM_NAME nvarchar(256) primary key,
   URI nvarchar(511) not null,
   SCHEMA_NAME nvarchar(256) not null,
   OBJECT_NAME nvarchar(256) not null,
   OBJECT_VERSION bigint not null,
   OBJECT_OID bigint not null).

At shown above at Table 3, the "SYNONYM_NAME" refers to an object name of the synonym, such as synonym 130 of the container 125. The "URI" refers to a file location where the synonym 130 is defined. The "SCHEMA_NAME" refers to the name (e.g., "BAR") of the schema of container 132 where the external object is located. The "OBJECT_NAME" refers to the name of the external object 132. The "OBJECT_VERSION" refers to the version number of the external object 132, and the "OBJECT OID" refers to an identifier of the external object 132.

The object such as table Y 132 may have a version (e.g., object version) and/or an identifier (e.g., object ID or OID). In some implementations, a change to the object causes a change to the version and/or ID. For example, a total replacement of the table Y object 132 may generate a new Object OID, while a minor change such as a column or field update may maintain the Object OID but change the OBJECT_VERSION. The DI may retrieve, from container 128, the OBJECT_VERSION for the external object 132, so it can check the current OBJECT_VERSION, which may be stored in the external object table 169 of metadata for external objects. For example, the DI may retrieve, via a database procedure such as a call, the object version of the external object 132 as follows:

CALL SYS.GET_OBJECT_VERSION (schema name, object name, . . . ).

The DI may retrieve, from the container 128, the OBJECT_OID for the external object 132, so it can check the current OBJECT_OID, which may be stored in the external object table 169 of metadata for external objects. The DI may retrieve the OBJECT_OID for the external object via a select, such as:

select OBJECT OID from SYS.OBJECTS where SCHEMA_NAME=$1 and OBJECT_NAME=$2

For a given synonym such as synonym 130, the DI may store in external objects table 169 the metadata to enable detection of changes to the external dependent objects. To save the external object metadata for a given synonym, the entries in the table 169 may be stored (e.g., created, modified, etc.) based at least on an identifier of the synonym (such as synonym name or other identifier of the synonym). In this way, the DI may identify some if not all external object associated with a given synonym. The DI may insert the metadata into the table as entries using the following:

insert EXTERNAL_OBJECTS (URI, SYNONYM_NAME, SCHEMA_NAME, OBJECT_NAME, OBJECT_VERSION, OBJECT_OID) values ($1, $2, $3, $4, $5, $6, $7) where SYNONYM_NAME=$3

If a synonym is dropped or deleted, the corresponding entry may then be removed from the external objects table 169.

After the container 125 persistency stores the external objects metadata in the table 169, the DI has a baseline of metadata from which the DI can detect changes to the metadata of the external objects (and thus the external objects). For example, external objects table 169 may store, for synonym 130, metadata for external object 132. This metadata may indicate that external table Y object 132 has an object ID of 1.0 and a version of 0.3. Later during a make associated with for example a revalidation of the objects of container 125 or for some other reason, the DI may obtained the current version or current ID of one or more objects at the container 128 (e.g., call, query, a SYS.OBJECTS, SYS.GET_OBJECTPVERSION, or other mechanism) to determine the current metadata for external object 132. If for example, the object ID and/or the version of external object changes, this signals to the DI that the external table Y object 132 may need to be redeployed at container 125 (along with other dependent objects 130, 126B and 126C). If for example, the object ID and/or the version of external object does not change, this signals to the DI that the external object 132 may not need to be redeployed for container 125.

Before a make that builds objects in container 125, the DI may check some, if not all dependencies, in the external objects table 169 and obtain the current metadata for the objects, which depend from the synonyms in container 125. In this example, the current metadata is obtained with respect to table Y 132 in the form of the current object ID (e.g., OBJECT_OID) and/or version (e.g., an OBJECT_VERSION). As noted, the external dependency may be considered "changed," if (1) the OBJECT_OID has changed and/or (2) the OBJECT_VERSION has changed.

In some implementations, an indirect dependency change may be detected so long as the indirect dependency changes affect the object ID and/or version of the external object 132. Assume for example multiple objects in the BAR container 128, such that these objects form a chain of dependent objects but only the first object 132 is linked to synonym 130. When this is the case, a change to one of the objects (included in container 128 and which object 132 depends on) may be propagated to object 132 as an ID and/or version change.

In the case of virtual tables, the metadata regarding changes may not be saved by the DI in the external objects table 169. Instead, the DI may query tables associated with the virtual tables themselves to check for changes and the need for revalidation. A virtual table may have the same structure as the referenced real table in another database. When doing queries on the virtual table, the data is actually retrieved from the real table. The check procedure compares the current structure of the virtual table with that of the real table. If the procedure reports differences, the real table was modified, so the virtual table is revalidated.

Figure 9A:
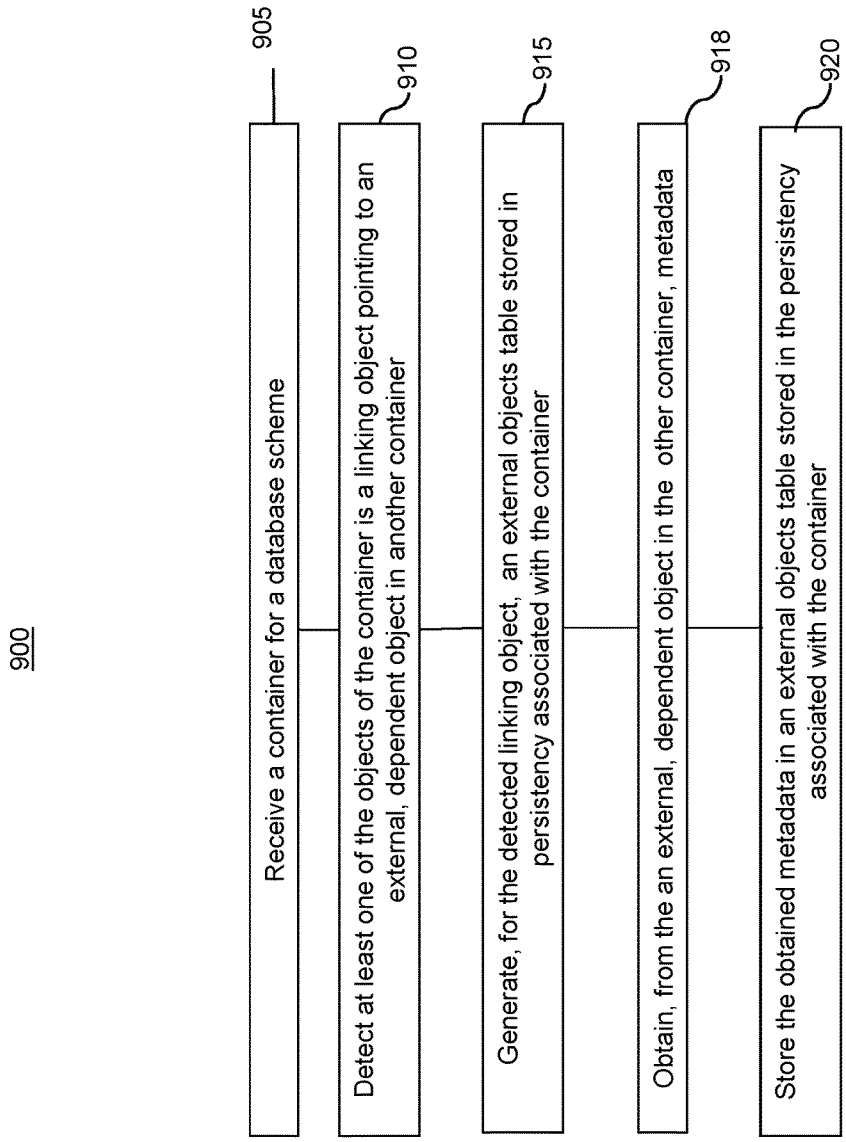
FIGS. 9A-9B depict examples of processes for the detection of dependencies across container boundaries, in accordance with some example embodiments.

FIG. 9A illustrates an example of a process 900 for the detection of dependencies across container boundaries, in accordance with some example embodiments.

At 905, a container providing a database schema may be received. For example, a deployment infrastructure (DI) may receive a container including a plurality of database objects, and at least one of the plurality of database objects may be a linking object, such as a synonym. This linking object may point to a database table object at another container having another database schema. To illustrate further, the DI, such as the deployment infrastructure 216 at FIG. 2, may receive one or more containers, such as container 125, 128, and the like. As noted, these containers are isolated, such that access to the objects of the container cannot be accessed by another container.

At 910, there may be a detection of the linking object pointing to the database table object at the other container. For example, the DI may detect a linking object, such as synonym 130 linked (or pointing) to an external, dependent object, such as table Y, at the container 128.

In response to detecting the linking object, an external objects table may be generated, at 915, for the linking object. For example, the DI may generate an external objects table 169 to store metadata about the external, dependent object, such as table Y 132, at the container 128. This external objects table 169 may be stored in a persistency associated with the database instance generated based on the container 125.

At 918, the metadata may be obtained about the external, dependent object in the other container. For example, the DI may obtain metadata about the external, dependent object, such as table Y, at the container 128. This may be obtained in a variety of ways, such as calls, selects, etc. This metadata about the external, dependent object may include one or more of the following: an identity (e.g., object name), object version, object ID, and/or the like.

At 920, the obtained metadata may be stored. For example, the DI may store the obtained metadata in the external objects table 169, although it may be stored in other locations as well.

Figure 9B:
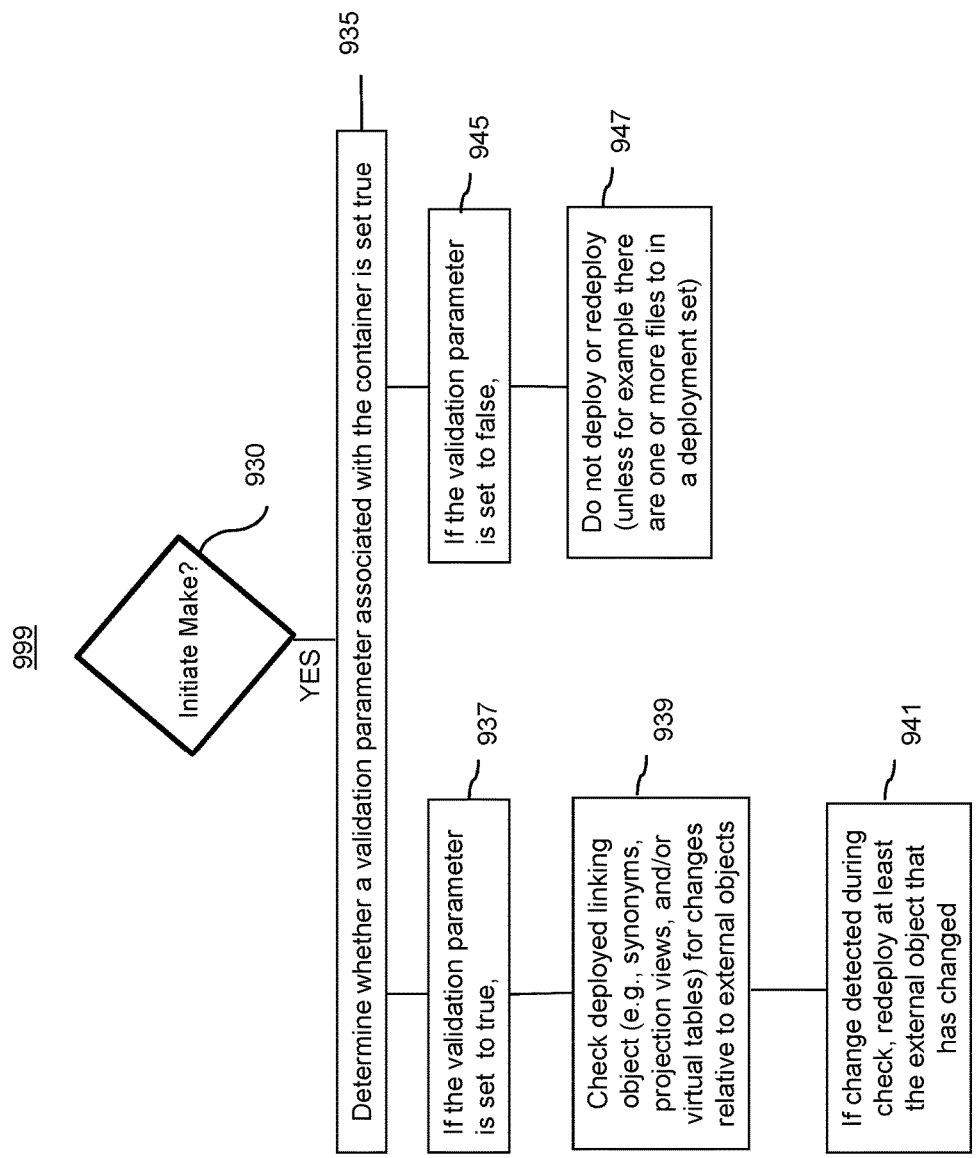

FIG. 9B illustrates another example of a process 999 for the detection of dependencies across container boundaries, in accordance with some example embodiments.

At 930, the revalidation may be triggered. For example, the revalidation may be triggered by a container call, such as a call for an API's MAKE procedure, when a user wants to update (e.g., add, delete, and/or modify) artifacts in the container. Alternatively, or additionally, the trigger may be caused by deployment tools that deploy entire applications where one of the application modules is a database module containing DI artifacts (e.g., for a new deployment or an update to a prior deployment).

At 935, a determination may be made regarding whether a validation parameter associated with the container is set to true. For example, the DI may check a validation parameter, an example of which is depicted at Table 4 below. The validation parameter tells the DI whether a make (e.g., a re-deploy of the objects of container 125) should be performed. For example, if the validation parameter (see, e.g., Table 4 at "parameter validate external dependencies") is "true," the DI then checks for external dependent objects, such as the external dependency to table Y 132, even if the DI has no files in a deploy set or an undeploy set. In other words, even though the DI has no files to deploy, the DI still does a check to see if redeployment is needed due to a change at an external, dependent object, such as table Y 132.

TABLE 4 if (parameter validate_external_dependencies == true) then always start a make, even if no files are in the deploy/undeploy sets.
Usage: Adjust db module package.json.
"start": "node node_modules/@sap/hdi-deploy/deploy.js --parameter validate_external_dependencies=true If the validation parameter is true, the DI may check one or more deployed linking objects (e.g., synonyms, projection views, and/or virtual tables) for changes at objects external to the container (937-939). For example, the DI may search the external objects table 169, and for each linking object listed in table 169 (e.g., synonym 130), obtain current metadata for external object table Y 132. For example, the DI may obtain "current" metadata, such as object ID and/or version for external object table Y 132. If the DI detects a change in the current metadata for external object table Y 132 and the previously stored metadata of table 169, the DI may redeploy, at 941, objects 130, 126B, and 126C for the container 125.

If the validation parameter is not true, the DI may not re-deploy the external object, such as table Y 132 (945-947). However, the DI may have one or more files in a container 125 deployment set to deploy, in which case the DI may deploy those files (which may dictate a re-deployment of external objects 132 and objects 126B-C and 130) for the container 125.

Although some of the examples refer to a synonym, such as synonym 132 at container 125, linking to an external object in another container 128, a projection view and/or virtual table may also be used to link to data external to the container and thus be checked by the DI for re-deployment as described herein with respect to the synonym examples.

Thus, if a synonym points to an object outside of the container, this external object (or one of its dependencies) can change over time, making it necessary to re-deploy the synonym and the objects in the container that depend on the synonym. These changes can be detected automatically during a make of the container based on a validation parameter (e.g., "validate external dependencies") that may be in a make file or in another parameter associated with the container. For example, the validation parameter may be set to "true." In the case of a projection view, it points to an object outside of the container. This external object (or one of its dependencies) can change as well over time, making it necessary to re-deploy the projection view and the objects in the container that depend on the projection view. Like the noted "synonym" example, these changes can be detected automatically during a make of the container, even when the projection view is not included in the set of files to be deployed. And in the case of virtual or remote tables, if this type of table is changed, the change may not be detected during deployment. To enable the checking and redeployment of changed remote/virtual tables, the validation parameter may also be used. The check may detect changes of the remote/virtual table and will redeploy the remote/virtual table. The check also detects deleted virtual tables and raises a warning. An explicit redeployment of such a remote/virtual table may need to be performed, if needed.

Figure 10:
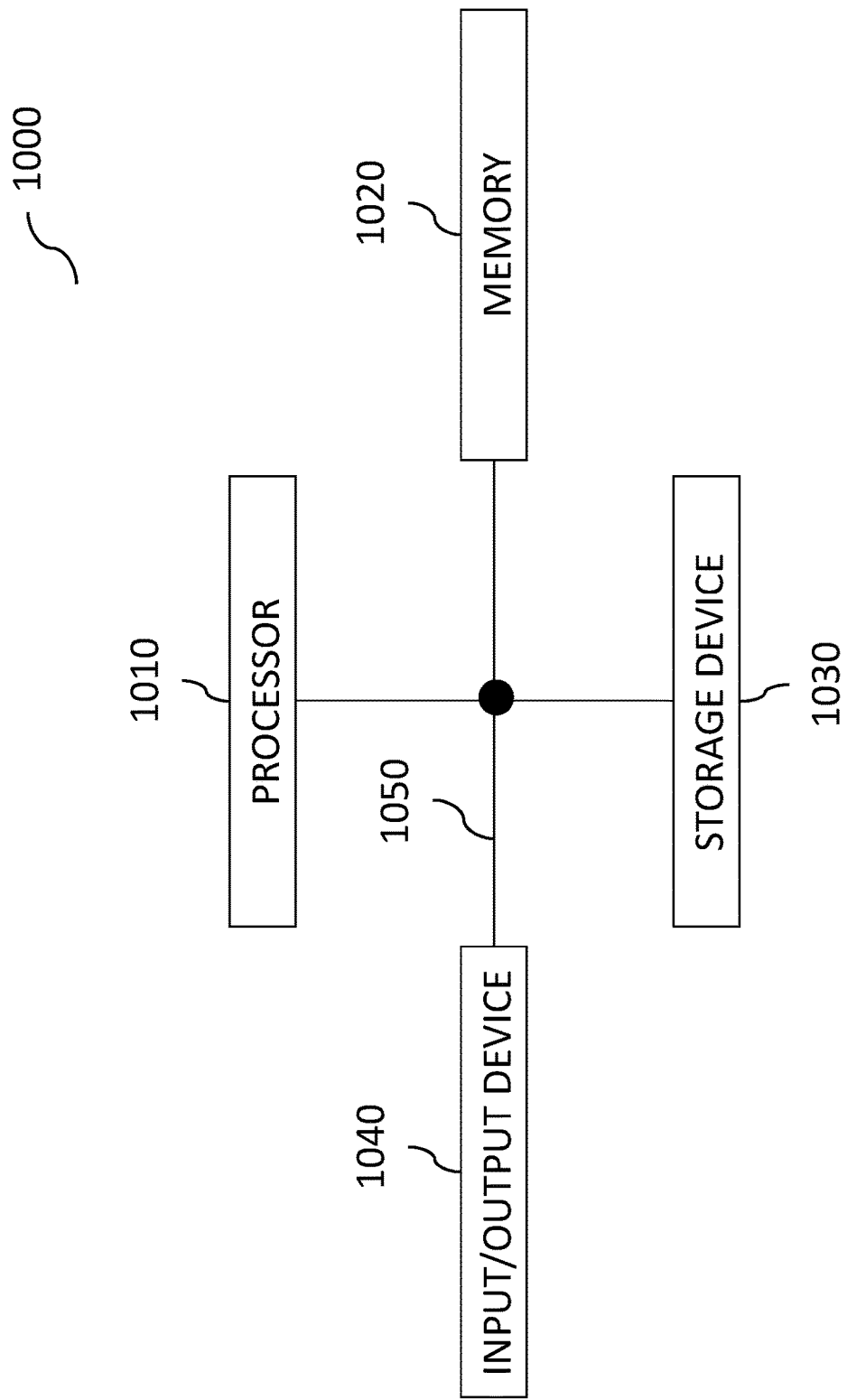
FIG. 10 illustrates another example of a system, according to some implementations.

In some implementations, the current subject matter can be configured to be implemented in a system 1000, as shown in FIG. 10. The system 1000 can include a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 1000. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit. The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/output device 1040 can include a keyboard and/or pointing device. In alternate implementations, the input/output device 1040 can include a display unit for displaying graphical user interfaces.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as in a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   receiving a container including a plurality of database objects;
   detecting whether the plurality of database objects in the container includes a linking object pointing to an external object at another container;
   in response to detecting the linking object:
      generating an external object table to store metadata about the external object located at the other container;
      obtaining the metadata about the external object to store in the external object table, wherein the metadata enables identification of changes to the external object; and
      storing the metadata in the external object table.

2. The method of claim 1 further comprising
   determining, based on a validation parameter, whether to check for changes associated with objects which are external to the container.

3. The method of claim 2 further comprising:
   in response to the validation parameter indicating to check for changes associated with objects which are external to the container, checking for at least one change to at least one object which is external to the container.

4. The method of claim 3 further comprising:
   accessing the external object table to obtain the metadata for the external object of the other container;
   obtaining current metadata for the external object at the other container;
   detecting a change to the external object at the other container based on a comparison of the metadata and the current metadata; and
   in response to detecting the change, redeploying at least one of the plurality of database objects in the container.

5. The method of claim 4, wherein the metadata comprises a version of the external object and an identifier of the external object, wherein the current metadata comprises a current version of the external object and a current identifier of the external object, and wherein when either the identifier or the version change, the external object is detected as a changed object.

6. The method of claim 1, wherein the other container comprises a plurality of dependent objects, wherein the plurality of dependent objects form a chain of dependent objects to the external object, and wherein only the external object is linked to the linking object.

7. The method of claim 6, further comprising propagating a change in a dependent object of the plurality of dependent objects to the external object, wherein the change is propagated as an identifier change or a version change associated with the external object.

8. The method of claim 1, wherein the container and the other container are isolated from each other, such that the plurality of database objects of the container are not accessible to the other container and objects in the other container are not accessible to the container, wherein the other container grants access to the linking object at the container to access the external object.

9. The method of claim 1, wherein the external object table is stored in a persistency accessible by the container.

10. The method of claim 1, wherein the metadata includes an identifier of the object and a version of the object.

11. A system comprising:

at least one processor;

at least one memory including code which when executed by the at least one processor causes operations comprising:

receiving a container including a plurality of database objects;

detecting whether the plurality of database objects in the container includes a linking object pointing to an external object at another container;

in response to detecting the linking object:

generating an external object table to store metadata about the external object located at the other container;

obtaining the metadata about the external object to store in the external object table, wherein the metadata enables identification of changes to the external object; and storing the metadata in the external object table.

12. The system of claim 11 further comprising:

determining, based on a validation parameter, whether to check for changes associated with objects which are external to the container.

13. The system of claim 12 further comprising:

in response to the validation parameter indicating to check for changes associated with objects which are external to the container, checking for at least one change to at least one object which is external to the container.

14. The system of claim 13 further comprising:

accessing the external object table to obtain the metadata for the external object of the other container;

obtaining current metadata for the external object at the other container;

detecting a change to the external object at the other container based on a comparison of the metadata and the current metadata; and in response to detecting the change, redeploying at least one of the plurality of database objects in the container.

15. The system of claim 14, wherein the metadata comprises a version of the external object and an identifier of the object, wherein the current metadata comprises a current version of the external object and a current identifier of the external object, and wherein when either the identifier or the version change, the external object is detected as a changed object.

16. The system of claim 11, wherein the other container comprises a plurality of dependent objects, wherein the plurality of dependent objects form a chain of dependent objects to the external object, and wherein only the external object is linked to the linking object.

17. The system of claim 16, further comprising propagating a change in a dependent object of the plurality of dependent objects to the external object, wherein the change is propagated as an identifier change or a version change associated with the external object.

18. The system of claim 11, wherein the container and the other container are isolated from each other, such that the plurality of database objects of the container are not accessible to the other container and objects in the other container are not accessible to the container, wherein the other container grants access to the linking object at the container to access the external object.

19. The system of claim 11, wherein the external object table is stored in a persistency accessible by the container, and wherein the metadata includes an identifier of the object and a version of the object.

20. A non-transitory computer-readable storage medium including code which when executed by at least one processor causes operations comprising:

receiving a container including a plurality of database objects;

detecting whether the plurality of database objects in the container includes a linking object pointing to an external object at another container;

in response to detecting the linking object:

generating an external object table to store metadata about the external object located at the other container;

obtaining the metadata about the external object to store in the external object table, wherein the metadata enables identification of changes to the external object; and storing the metadata in the external object table.

* * * * *